United States Patent Office 2,965,467
Patented Dec. 20, 1960

2,965,467

METHOD OF DEFOLIATING PLANTS

Francis X. Markley, Ferndale, Mich., assignor, by mesne assignments, to Pittsburgh Coke and Chemical Company, a corporation of Pennsylvania No Drawing. Filed Oct. 16, 1956, Ser. No. 616,143

9 Claims. (Cl. 71—2.7)

This invention relates to the defoliation of crops, to the preparation of agricultural plants for harvesting, and to forced maturing. This invention also relates to control of economic pests by altering the life-cycle of botanical hosts.

It has been recognized for many years that in order to reap the optimum crop from a large variety of plants, in particular those plants of luxuriant growth yielding a crop which is field-harvested, it is desirable to alter the growth of those non-harvestable, functional organs of the plant in order to render accessible, or hasten the maturity of, the harvestable portions.

It is well known that during the normal life process of a herbaceous plant, the leafy portions drop as a result of changes in a group of specialized cells at the base of the petiole. The outward effect is the result of development of an abscission layer composed of meristematic cells developed across the base of the petiole. The mechanism of these changes is essentially little understood, but a number of external, naturally occurring factors are known to produce this inner growth effect. For example, in certain species, a decrease in ambient temperature at the proper period in the life cycle of the plant causes the natural formation of the abscission layer. Likewise, an injury, through disease or adverse growing conditions, will be conducive to such abscission layer, resulting in the sloughing-off by the plant of the injured member. A number of additional causes of natural origin, or abnormally imposed by nature on the plant, bring about defoliation.

None of the above methods of defoliation are available as means for controlling defoliation at will. A few attempts have been recorded to bring about such defoliation at the desired period in the life cycle of the plant. Such prior methods have been inadequate in that injury to the plant and a consequent decrease in crop yield results, defoliation is incomplete, secondary effects of an undesirable nature are produced, or the applied materials are nonadherent or removed by weathering, resulting in the necessity for repeated and costly applications, or must be applied during a limited and critical period during the growing season.

The present invention has for an object the provision of formulations and methods effective in causing defoliation. A further object of this invention is the provision of materials and methods for preparing agricultural crops for harvest. A further object is to control pest infestation by altering the life-cycle of hosts for such agricultural pests. Likewise, it is an object of this invention to provide compositions which enhance the value of agricultural crops, hasten the maturity thereof, and permit optimum harvest to be obtained. Still further objects will be apparent from the further description of this invention hereinafter.

The defoliation and the resulting improvement in crop value and indirect control of pest infestation is achieved by applying defoliant compositions containing certain members of the class of organic thiophosphates in combination with surface contacting agents directly to the foliage of the plant. In particular, the thiophosphates employed in this invention are aliphatic thiophosphates $(R_1O)(R_2O)$, $(R_3S)PO$, aliphatic dithiophosphates.

$$(R_1O)(R_2S)(R_3S)PO$$

and aliphatic trithiophosphates $(R_1S)(R_2S)(R_3S)PO$ in which the groups $R_1$, $R_2$, $R_3$ can be the same or different. The foregoing nomenclature is in accordance with Kosolapoff "Organic Phosphorus Compounds," Wiley, 1950. In a preferred embodiment of this invention, the aliphatic groups in the active ingredient are lower aliphatic groups, that is, containing individually one to eight carbon atoms. Thus, the active ingredient of the defoliant compositions of this invention can be represented by the general formula

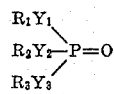

wherein one to three of the atoms $Y_1$, $Y_2$, and $Y_3$ is sulphur and the remaining oxygen, and wherein each of $R_1$, $R_2$, and $R_3$ are the same or different aliphatic radicals and in the preferred embodiment, such aliphatic radicals contain 1 to 8 carbon atoms. In an especially preferred embodiment, the groups $R_1$, $R_2$, and $R_3$ are unsubstituted monovalent alkyl hydrocarbon radicals each having from 3 to 5 carbon atoms and at least two of $Y_1$, $Y_2$, and $Y_3$ are sulphur. For certain purposes, the aliphatic radicals can contain halogen atoms, particularly chlorine, bromine and iodine, and of these the chlorine atom is preferred. However, in this instance the haloaliphatic group should be attached to phosphorus through oxygen. Among such substituted aliphatic thiophosphates of this invention, it is preferred to employ only one substituted aliphatic radical having up to about 4 carbon atoms.

Specific illustrative examples of a preferred group of active ingredients in the defoliant compositions of this invention include: trimethyl trithiophosphate, triethyl trithiophosphate, dimethyl ethyl trithiophosphate, O-methyl-(S,S)-diethyl dithiophosphate, triisopropyl trithiophosphate, S,S-dimethyl-O-propyl dithiophosphate, tri-n-propyl trithiophosphate, methyl dipropyl trithiophosphate, O-methyl-S-ethyl-S-propyl dithiophosphate, di-n-butyl propyl trithiophosphate, O-methyl-O-ethyl-S-n-butyl thiophosphate, tri-n-butyl trithiophosphate, methyl ethyl n-butyl trithiophosphate, tri-isobutyl trithiophosphate, tri-sec.-butyl trithiophosphate, dipropyl-n-butyl trithiophosphate, tri-n-amyl trithiophosphate, O,O-diisoamyl-S-n-butyl thiophosphate, tri-sec.-amyl trithiophosphate, tri-n-hexyl trithiophosphate, propyl butyl hexyl trithiophosphates, tri-3-methylpentyl trithiophosphate, tri-n-heptyl trithiophosphate, O-butyl-(S,S)-diheptyl dithiophosphate, tri-n-octyl trithiophosphate, O-isooctyl-S,S-diisooctyl dithiophosphate, tri-2-ethylhexyl trithiophosphate and the like. From the foregoing, it can be seen that the aliphatic radicals of the active ingredient of the defoliant compositions of this invention can be straight or branched chain.

One of the advantages of the defoliant compositions of this invention resides in the fact that the conditions existing at the time of or after application are of secondary significance. For example, various inorganic or water soluble defoliant compositions have been suggested. Among these are water soluble fluorides, chlorates and hypochlorites, sulfamic acid derivatives, cyanamides and chlorinated phenols and salts thereof. In order to obtain any degree of defoliation with the above-mentioned defoliants it is ordinarily desirable to apply them under such atmospheric conditions that surface moisture is deposited on the leaf to aid in intimate contacting of the active ingredient with the leaf surface. Obviously the limits of humidity within which such compositions are effective is narrow and excessive moisture would cause the materials to be washed off the plant surface before effective defoliation could occur. Such dependence on nature's whims seriously limits the applicability of the practice of defoliation, as the important variable to consider is the state of growth of the plant. The materials comprising the defoliants of this invention withstand the weathering effects of moisture and furthermore possess the advantage that they can be applied either to the dry leaf surface or to a leaf surface which has already been moistened by rain or dew. In either event effective defoliation will take place and the method is largely independent of ambient atmospheric conditions.

Organic phosphates have received considerable attention in the past and more recently have been suggested an insecticides. Indeed, one of the principal advantages of the phosphorus-containing insecticides, in addition to their universality, is their low phytotoxicity permitting application at effective dosage levels on growing agricultural crops without damage therto. In this regard, it is interesting to note that materials closely related to the foregoing ingredients of the compositions of this invention have been suggested for this use. Among these may be exemplified the dialkyl chloroaryl thiophosphates, as disclosed in U.S. Patents Nos. 2,599,512, 2,599,515, 2,599,516, the dialkyl chloroarylphosphates as suggested in U.S. 2,599,375, the dialkyl chlorothiophosphates as shown in U.S. 2,663,723, the trialkylphosphates of U.S. 2,552,325 and the O-O-dialkyl-O-alkylmercapto-alkyl thiophosphates in U.S. 2,571,989. This last class is of particular interest in connection with the foregoing as they have been suggested as systemic insecticides which inherently must be non-phytotoxic. It will be noted that none of the materials disclosed in the art discussed herein above contains all the essential ingredients of the materials of this invention as shown by the foregoing formula and which are effective by virtue of their combination with properly selected surface contacting agents. It is noted that the compounds comprising the active ingredient of the formulations of this invention contain pentavalent phosphorus. It has recently been suggested that trivalent organic phosphorus compounds, for example U.S. 2,722,479, are effective pre-emergence herbicides. The formulation of this invention on the contrary has a selected hormonal activity directed to the leafy structures of the plant without, in the concentrations employed, having a herbicidal effect. Indeed, the criticality of the structure shown above for the active ingredient of the defoliants of this invention is particularly pointed out when the completely sulfurreted analogs of one of the preferred materials of this invention, namely, tri-n-butyl tetrathiophosphate, is essentially inactive in plant response properties.

Many of the materials which have been suggested previously as defoliants suffer the serious disadvantage that they must be applied at a particular period in the life cycle of the plant. Thus, for example, certain defoliants which have been previously suggested, in particular the chlorinated phenol type must be applied just after the crop has been made in the case of cotton defoliation. Other defoliants, in particular the inorganic type must be applied during a period when the plant has reached maturity. For example, in the case of cotton defoliation, at such period when the bolls are essentially completely developed. Thus, it is common practice to attempt defoliation with such materials during the traditional harvest period, that is, in the relatively dry months of the year. Because of the requirements of humidity it is usually necessary in such cases to introduce a humectant such as calcium chloride, magnesium chloride, or other hygroscopic agent along with the defoliant ingredient. Inclusion of such materials complicates the application, causing injury to the plant and in general reducing the desirability of employing such defoliant compositions. It has been found that the materials of this invention are capable of effecting defoliation at a diversity of periods during the life cycle of the plant wherein true leaves have been produced. Thus, the materials are effective in defoliating a wide variety of agricultural crops. For example, when applied to tomato plants defoliation has been achieved during the active growing season when the vegetation is lush and therefore promote early and uniform ripening of the fruits and also thereby controlling insect pests by eliminating the leafy portions of the plant upon which they feed during this growing period. Likewise, in applications on cotton plants complete defoliation has been achieved in young plants, not more than 6 or 7 inches high. The implications of such activity with regard to boll weevil control opens up a novel approach to this serious problem. In such instances, it has been observed that the plant is not killed by the application of the defoliants, and, in fact, after the leaves have dropped off the plant, within a short period of time a new and vigorous growth of leaves has been resumed. In defoliating the leguminous plants such as soy bean, it is possible to bring about defoliation at any desired stage in the development of the bean. Thus, if it is desired to harvest mechanically the green edible bean or the dried bean, the defoliant composition of this invention can be applied at the appropriate period with equally effective results. Observation of the operation of the defoliant ingredients indicates that when properly applied a true hormone type action is involved, and the defoliants operate by a true translocation within the plant system. Apparently the defoliation caused by the materials of this invention resembles closely the defoliation brought about by natural circumstances occurring in the life cycle of the plant as evidenced by the regrowth of true leaves which has been observed after defoliation in the presence of these materials. An advantage of this type of defoliation, and one which is achieved to a marked degree with these defoliant compositions, is a further independence of the atmospheric conditions pertaining at the time of defoliation. Many defoliants previously described require mechanical removal of the leaves after the damage or withering brought about by the applied agent. Frequently, it is hoped that this can be brought about by movement of the leaves caused by wind or it is necessary to go through the field being treated and actually knock off the withered leaves mechanically. It has been observed that after application of the defoliants of the invention there is first a bending of the leaf petiole at the abscission layer followed by a natural dropping from the stem. Depending upon the type of plant, the maturity at application, and the seasonal conditions the leaves will either remain green and succulent before dropping or will achieve a condition similar to that existing just prior to natural defoliation.

In order to obtain practical benefit from the inherent defoliant activity of the thiophosphates, they are employed in conjunction with certain surface contacting agents, that is a surface-active dispersant having non-phytotoxic properties. One purpose of the surface contacting agent is apparently to provide a medium by which the active ingredient is placed in proper contact with the leaf surface and can be absorbed thereby into the plant system and by translocation be effective at the site where abscission occurs. Another purpose of a surface contacting agent is to permit the application of the materials in a uniform manner on the leaf surfaces and in the appropriate minute quantities required, that is in those proportions required by the characteristics of the plant and the seasonal requirements.

The thiophosphate esters comprising the active ingredient of this invention can be prepared by methods well known in the art. One satisfactory method is the reaction of alkali metal mercaptides and phosphoryl trichloride in the case of the trithiophosphates. For the mixed oxygen and sulfur-containing ingredients either an appropriate mixture of alkali metal alcoholates and mercaptides can be reacted with the phosphoryl trichloride or the alcoholate and mercaptide can be reacted stepwise and in appropriate stoichiometric proportions with the phosphoryl trichloride. Another satisfactory method for the manufacture of thiophosphate esters comprises the direct interaction between an alcohol having the desired aliphatic groups, or the corresponding thiol or mercaptan, with phosphoryl trichloride in the presence of an organic base. Particularly good results are obtained when tertiary amines are employed as the basic reagent and it is preferred to employ 3 molar equivalents per mole of phosphoryl trichloride to be reacted.

A particularly preferred and novel process for preparing the thiophosphate esters as above is the use of a sodium dispersion, that is, sodium dispersed in an inert liquid such that the particle size of the sodium is below 50 microns and ordinarily above 1 micron and containing a dispersing agent, to prepare the sodium derivative of the thiol, or the alcohol when preparing the mixed esters.

Other methods for preparing the thiophosphates employed in the defoliant compositions of this invention comprise the transformation of a tertiary thionophosphate in the presence of an aliphatic halide. Thus, for example, by reaction of tri-n-butyl thionophosphate with n-propyl chloride, the principal product is O,O-(di-n-butyl)-S-(n-propyl)thiophosphate. Other mixed esters for use in this invention can be similarly prepared.

In general the active ingredients of this invention are clear oily materials which can be purified by solvent extraction. The materials are in general hydrolytically stable and therefore can be separated from the undesirable acidic impurities by treatment with caustic.

In the illustrative examples which follow, unless otherwise specified, all parts and percentages are by weight.

EXAMPLE I n-Butanethiol, 270 parts, was added slowly and with agitation to a refluxing mixture of 50 percent sodium dispersion in heavy alkylate and 160 parts of toluene. This addition was conducted for a period of 3 hours after which refluxing was continued for an additional 2 hours during which period an additional 160 parts of toluene was added. Upon cooling the reaction mixture which now contains 336 parts of the sodium mercaptide to a temperature of about 25° C. was added 154 parts of phosphoryl trichloride over a period of 2 hours while agitating the reaction mixture. During this addition, the temperature in the reaction vessel increased to 70° C. at which point heating was continued to a final temperature of 90° C. Upon reaching this temperature, evidences of decomposition were detected and the mixture was thereupon cooled to about 25° C. and filtered. The filtrate was washed with a 5 percent aqueous caustic solution and then with water. The organic portion of the reaction mixture was then heated under reduced pressure to remove the solvent and volatile impurities. The residue was an amber colored oil, 157.2 parts, corresponding to a yield of 50 percent. This product had a density at 20° C. of 1.532. Elemental analysis indicated phosphorus 9.73 percent and sulphur 31.9 percent compared to that calculated for $C_{12}S_3PO$ phosphorus 9.85 percent and sulphur 30.59 percent.

EXAMPLE II

The following is a typical procedure for the base-condensation process.

Three molar equivalents of n-amyl mercaptan in toluene as a solvent and containing 3 molar equivalents of triethyl amine is treated over a period of 4 hours with one molar equivalent of phosphoryl trichloride at the reflux temperature of the mixture. Upon cooling of the reaction mixture to approximately 25° C. the mixture is extracted with a weak hydrochloric acid solution to remove the amine hydrochloride by-product. Upon washing the organic phase with a sodium bicarbonate solution the solvent is removed by mild distillation. The residue, a pale amber oil having a density of approximately 1.5, represents better than a 50 percent yield of tri-n-amyl trithiophosphate.

EXAMPLE III

By substituting isobutyl mercaptan in Example I, triisobutyl trithiophosphate, a nearly colorless oil, is obtained in high yield and purity.

EXAMPLE IV

Sec.-butanethiol in the presence of an equivalent amount of pyridine in a kerosene fraction as a solvent produces tri-sec.-butyl trithiophosphate, a slightly viscous oil according to the procedure of Example II.

EXAMPLE V

Isopropyl mercaptan in accordance with the procedure of Example I provides in high yield triisopropyl trithiophosphate when reacted as the sodium mercaptide with phosphoryl trichloride.

EXAMPLE VI n-Propyl thiol in the presence of pyridine and phosphoryl trichloride produces tri-n-propyl trithiophosphate in accordance with the procedure of Example I.

EXAMPLE VII

Triisoamyl trithiophosphate is produced in high purity and yield by reaction of the potassium salt of isoamylmercaptan with phosphoryl trichloride in the presence of a solvent for the product comprising equal parts of heavy alkylate and toluene in accordance with the procedure of Example I.

EXAMPLE VIII

Neopentyl mercaptan (3 moles) is heated with agitation in an equal volume of xylene with 3 atom equivalents of sodium at about 100° C. The neopentyl mercaptan begins to react with the sodium as it approaches the melting point and thereupon the reaction increases in velocity. As the temperature is increased above the melting point of sodium, the sodium becomes finely subdivided. Upon completion of the reaction, as evidenced by the disappearance of the sodium, an equivalent amount of phosphoryl trichloride, dissolved in an equal weight of xylene, is added while maintaining the temperature of the reactor at about 80° C. Upon completion of the addition, or after about 3 hours, the reaction mixture is cooled to a temperature of 25° C. and filtered. The product is recovered in accordance with the procedure of Example I.

In accordance with the procedure of the foregoing examples the other defoliant compositions of this invention are readily prepared. Likewise if in the general procedures of Examples I and II, mixtures of alcohols and thiols are employed, the product consists of the corresponding mono- and dithiophosphates.

The formulations which are useful in conducting the present invention are generally those in which the active material is admixed either in concentrated or in dilute form with a conditioning agent which provides means of applying the active ingredient to the surface of a growing plant but which at the same time does not itself introduce phytotoxic properties to the formulation.

In general, such non-phytotoxic conditioning agent can be either dry or wet, thus providing both liquid and solid formulations. However, the important characteristic is the provision of the dispersing property, achieved by incorporation of a surface active agent. Typical examples of such dry non-phytotoxic carriers which are useful as dispersing agents or adjuvants include relatively inert dusts or powders, both organic and inorganic. Certain solid carriers in themselves are considered as being of the wetting type, and in such instances they function as the surface-active agent. Dry or dust formulations of the defoliant compositions can either be in such dilution of the active ingredient as to be directly applicable to the plant or can be in concentrated form.

In liquid formulations of the defoliant composition of this invention it is likewise necessary to employ a liquid which in the ultimate concentration of application to the plant surface renders such formulation relatively non-phytotoxic. Typical examples of liquids suitable for this purpose include water, various hydrocarbon liquids or oils, and certain organic solvents.

Although the cotton plants to which the defoliants can be profitably applied usually exist in aqueous environment, one very effective method of applying such defoliants is in the form of organic or oil solutions, suspensions, or emulsions as the adjuvant. One particular advantage of this type of surface-contacting formulation is that even under extreme conditions of high humidity or rainfall the defoliant materials adhere tenaciously to the plant surface.

Aqueous dispersions or solutions of the defoliants can also be applied to the crops with good effect.

Where the conditions under which application is being made permit the use of dust formulations, it has been found that the certain solid carriers as conditioning agents perform the function of providing a surface-contacting agent in certain applications equally effective as the above mentioned oily or aqueous formulations. A further advantage of employing the defoliants in dust formulations resides in the organic nature of the defoliant; that is, here again the materials are not dependent upon the fortuitous deposition of the proper amount of moisture in the form of dew as has been the experience in attempting defoliation with dry formulations of previously suggested defoliants.

One method of applying the defoliants of this invention is in the form of an oil solution wherein the materials are dissolved in a hydrocarbon oil as typified by kerosene, T-942-B oil, Enjay oil, xylene, and certain non-herbicidal petroleum oils, in particular those of medium weight or viscosity, in concentrations between the limits of about 0.1 and 23 weight percent. In such formulations it is believed that the oil itself is the surface-contacting agent or adjuvant, an effect which is brought about by the peculiar leaf nature of the upper leaf surface wherein a waxy cuticle exists permitting the initial contact between the defoliant and the actual plant surface in the presence of the oil to be achieved. The following example illustrates methods of preparing such defoliant compositions.

EXAMPLE IX

To 100 parts of mineral oil is added tri-n-butyl trithiophosphate in the amount of 5 parts. A composition suitable for application is made from this concentrate by further diluting with the oil to a final thiophosphate concentration of 0.5 weight percent. When applied to cotton plants, the above formulation exhibits effective defoliation.

Likewise, similar oil formulations of trimethyl trithiophosphate, dimethyl ethyl trithiophosphate, O-methyl-S,S-diethyl dithiophosphate, tri-n-propyl trithiophosphate, S,S-dimethyl-O-propyl dithiophosphate, O,O-diisoamyl-S-n-butyl thiophosphate, propyl-butyl hexyl trithiophosphate, tri-n-heptyl thiophosphate, and the like can be prepared. Other oils, such as kerosene, toluene, xylene, cumene, etc., can be used with good results, and these oil formulations can have incorporated within them surface-active agents such as those illustrated below.

For certain applications the defoliant compositions of this invention are preferably employed suspended in the conditioning agent. Such suspensions can be made by one of the following methods: A concentrated oil solution of the active ingredient is prepared, and this is added to water containing a dispersing agent; a solution of one of the defoliants in a water-soluble solvent is prepared which is thereupon added to water containing a dispersing agent; or a water suspension of the defoliant is prepared and added to an oil in the presence of a dispersing agent. Thus, a water and oil emulsion of the active ingredient can be prepared. Examples of typical dispersing agents which can be employed in forming dispersions include salts of the alkyl and alkylaryl sulfonates, such as the sodium salt of sulfonated ethyloleate, the sodium salt of sulfonated oxidized petroleum oils, dioctylsodium sulfosuccinate, sodium decylbenzene sulfonate, potassium dodecylbenzene sulfonate, and the sodium salt of sulfonate ethyloleylamide; alkyl sulfates, such as sodium lauryl sulfate, sodium oleyl sulfate, ammonium ricinoleyl sulfate, and the like; alkylaryl polyether alcohols, such as alkyl phenoxy, polyethoxy-ethanol (alkyl can be methyl to $C_{20}$), the condensate of ethylene oxide and alkylated cresol, polyoxy ethylene thioether, and the like; fatty acid esters of polyhydric alcohols, such as mannitol monolaurate, sorbitan monooleate, and the like; and the ethylene oxide addition products of such esters, such as the polyoxy ethylene derivative of sorbitan monooleate, etc.

The following examples typify methods of preparing the above formulations.

EXAMPLE X

A formulation of S,S-(di-n-butyl)-O-(β-chloroethyl)-dithiophosphate is prepared by intimately admixing 10 parts of this material with 90 parts of water containing 0.1 part of polyoxyethylene thioether. Ten parts of this aqueous suspension is thereupon added to 190 parts of T-942-B oil to form a final formulation consisting of 0.5 weight percent of active ingredient in an oil-in-water emulsion containing a surface-active agent. This material in its final dilution is an effective cotton defoliant.

Equally good oil and water emulsions having high defoliant activity are similarly prepared from the following materials: methyl dipropyl trithiophosphate, O-methyl-O-ethyl-S-n-butyl thiophosphate, tri-n-butyl trithiophosphate, and tri-n-hexyl trithiophosphate and the like.

EXAMPLE XI

A 10 percent solution of triisopropyl trithiophosphate is prepared in methyl alcohol, and the resulting solution is added to 100 parts of water containing 1 part of sodium lauryl sulfate to provide an aqueous suspension comprising 1 percent of the active ingredient in an alcohol-water mixture.

In a similar manner are prepared such suspension of trimethyl trithiophosphate, triethyl trithiophosphate, O-methyl-S-ethyl-S-propyl dithiophospate, dipropyl-n-butyl trithiophosphate, and similar materials with equal effectiveness. Other organic solvents which may be used in such formulations include Carbitol, Cellosolve, methyl Cellosolve, acetone, isophorone, methyl isobutyl ketone, methylethyl ketone, isopropanol, and the like. A variety of surface-active agents of the type illustrated above may be used.

EXAMPLE XII

A mixture of 50 parts of tri-isooctyl dithiophosphate, 100 parts of bentonite, and 0.5 part of calcium dodecylbenzene sulfonate is treated in a ball mill for a period of one-half hour. At the end of this period the mixture is screened to pass a 100-mesh sieve. This 50 weight percent wettable powder formulation is further treated to form a suspension suitable for application by adding with agitation 100 parts of the wettable powder to 1,000 parts of water. The resulting aqueous suspension of the solid surface-contacting agent and defoliant is suitable for spraying directly upon crops.

EXAMPLE XIII

An emulsifiable concentrate is prepared by treating 10 parts of tri-n-butyl trithiophosphate with 65 parts of cyclohexanone, 20 parts of xylene, and 5 parts of sodium alkylaryl sulfonate. This concentrate is further diluted with water so as to contain one percent active ingredient to make an effective defoliant formulation. Typical of the thiophosphates which can be so formulated to provide efficient defoliating formulations include triisopropyl trithiophosphate, methyl ethyl n-butyl trithiophosphate, tri-sec.-butyl trithiophosphate, tri-3-methyl-pentyl dithiophosphate, triisooctyl dithiophosphate and the like.

EXAMPLE XIV

An oil concentrate is prepared by dissolving 100 parts of tri-n-butyl trithiophosphate in 90 parts of xylene containing 10 parts of a commercially available blend of a polyalcohol carboxylic acid ester and a sulfonated oil. This clear non-phytotoxic defoliant concentrate can be directly added to water with only mild agitation to prepare dilute formulations effective for application to the field crop.

For certain applications, particularly when defoliants are applied to plants during the active growing season and regrowth of new leaves might occur and be undesirable, it is possible to employ along with these defoliants any of several agents designed to stunt the growth of the plant. A typical example of such materials is maleic hydrazide. In addition to maleic hydrazide it is sometimes desirable to employ a material such as sucrose to enhance the ability to prevent regrowth of the leafy structures of the plants. Furthermore, an adherent agent can be employed along with such defoliants, if this is desired, without interfering with the activity thereof. Likewise, it is possible to employ humectants along with the defoliants, particularly when dry formulations are employed.

A number of methods are available for applying the defoliants of this invention, including power driven spray, hand spray, aircraft spraying, and the like. The materials of this invention are particularly advantageous in the latter method of application in that the oil formulations illustrated above can be employed to advantage in that good adherence and little drifting is encountered. Thus, one of the major drawbacks to the commercial utilization of previously suggested defoliants has been overcome by this embodiment of the invention.

The quantity of active ingredient present in the surface-contacting defoliant compositions is not critical. It is preferred to employ the defoliant ingredient in amount between about 0.1 and 25 percent by weight. Concentrates as above may vary from about 20 to about 80 weight percent active ingredient. The amount of defoliant formulation applied to a crop depends, of course, on a number of variables. For example, the greater the number of leaves and leaf surfaces exposed per acre, the greater the amount of defoliant required. Similarly, the species of genus of plant defoliated will be a determining factor. Furthermore, the period in the growing season as well as the conditions under which the plants are grown is important. Thus, tough leaves grown in arid climates generally require more defoliant than lush new growths.

The rate of application in terms of active ingredient can very depending upon atmospheric conditions, the growing conditions under which the crop matured, the particular species of plant type being defoliated and the period of the growth cycle. In general, however, good defoliation can be obtained by employing as little as one-half to six pounds of active ingredient per acre. Under extremely difficult defoliating conditions it may be necessary to apply as much as ten pounds per acre. However, at the higher dosage rate desiccation may occur if the crop has been growing under favorable growing conditions such that the leaves are luxuriant and tender. No adverse phytotoxic effects are noted when the crops have been growing under adverse conditions and the leaves are tough and leathery, the plants remaining upright and harvestable portions remaining firm and in marketable condition. To exemplify the results obtained by employing the formulations described above, cotton plants growing under natural conditions were treated as follows:

EXAMPLE XV

Cotton variety Deltapine 15 was grown under favorable conditions. The growing conditions were good and the cotton production approximately 2 bales per acre. Employing aqueous defoliant compositions of tri-n-butyl trithiophosphate from a tractor mounted spray delivering 28 gallons of liquid composition per acre, 78 percent defoliation was achieved employing an active ingredient at such concentration that its dosage rate was 2 pounds per acre. Increasing the concentration to 6 pounds per acre, 78 percent defoliation was achieved and at this rate a trace amount of desiccation was observed. The following table further illustrates typical results obtained on different tracts.

*Table 1*

| Cotton Variety | Growing Conditions | Yield, Bales/Acre | Percent Defoliation | Dosage, Lbs./Acre |
|---|---|---|---|---|
| Deltapine Fox | Dryland | .75-1.0 | 83.5 | 4 |
| Deltapine 15 | do | [1] .66 | 94.7 | 4 |
| Do | Supplemental Irrigation | [2] 1.5 | 96.4 | 3 |
| Do | do | 1.5 | 93.4 | 5 |
| 291-A | Irrigation | 1.0 | 83.0 | 4 |
| Coker's 100WR | Dryland | | 95 | [3] 2 |

[1] One supplemental irrigation.
[2] Plants large and rank.
[3] 18 day test, dosage 20 gallons per acre.

Under similar field conditions and methods of application the following compounds produce comparable results; trimethyl trithiophosphate, triethyl trithiophosphate, O-methyl-S-ethyl-S-propyl dithiophosphate, dipropyl-n-butyl trithiophosphate.

In further demonstration of the results obtained by the defoliant compositions of this invention, a variety of materials was applied at rates of 2 and 4 pounds per acre in an aqueous suspension containing a surface-active agent at a dosage rate of 20 gallons per acre. The cotton was 120 days old, and observations were made ten days after application. The following table, based on a value of 10 for perfect defoliation, shows the relative ratings of certain trithiophosphate defoliants.

*Table 2*

| Defoliant | Relative Rating |
|---|---|
| 1. Trimethyl trithiophosphate | 2 |
| 2. Triethyl trithiophosphate | 3 |
| 3. Tri-n-hexyl trithiophosphate | 3 |
| 4. Triisoamyl trithiophosphate | 5 |
| 5. Tri-sec.-butyl trithiophosphate | 5 |
| 6. Triisopropyl trithiophosphate | 5 |
| 7. Triisobutyl trithiophosphate | 7 |
| 8. Tri-n-amyl trithiophosphate | 7 |
| 9. Tri-n-propyl trithiophosphate | 8 |
| 10. Tri-n-butyl trithiophosphate | 8 |

It will be noted that while all the above materials provide good defoliant activity, there is a marked superiority evidenced by the materials 4–10. Thus, it is seen that the alkyl trithiophosphates having 3 to 5 carbon atoms, inclusive, in each alkyl radical provide a preferred species of this invention. A similar representation of the dithiophosphates and monothiophosphates illustrates that the order of decreasing activity of the active defoliants is trithiophosphates, dithiophosphates and monothiophosphates. However, similar demonstrations made with the other defoliants of this invention produced good results. For example, under the above conditions of test O-methyl-S,S-diethyl dithiophosphate, S,S-dimethyl-O-propyl dithiophosphate, methyl dipropyl trithiophosphate, O-methyl-O-ethyl-S-n-butyl thiophosphate, O,O-diisoamyl-S-n-butyl thiophosphate, propylbutyl hexyl trithiophosphate, tri-n-heptyl thiophosphate as well as S-din-butyl β-chloroethyl dithiophosphate, and S-n-butyl-O,O-di-β-chloroethyl thiophosphate produced good to very good defoliation when applied at rates between 0.5 and 6 pounds active ingredient per acre. At higher concentrations, that is up to 10 pounds per acre, defoliation is also excellent but in some instances desiccation occurs. Indeed under some conditions of use desiccation is a preferred means of defoliation. In this procedure the plants are permitted to become desiccated and the entire crop is harvested. While this does not obviate completely the necessity for separating the cotton from the foliage, the procedure is still advantageous as the desiccated leaves do not stain the cotton in the gin. Thus, in the case of tri-n-butyl trithiophosphate as little as 0.5 pounds per acre produces over 50 percent defoliation which for many purposes is adequate, and at the rate of 2 to 6 pounds per acre substantially 100 percent defoliation occurs, while at the rate of 10 pounds per acre desiccation occurs without adverse effect on the cotton.

I claim:

1. A method of defoliating plants which comprises applying thereto in an amount sufficient to cause defoliation an S,S,S-tri-n-alkyl trithiophosphate wherein each alkyl group contains 3 to 5 carbon atoms.

2. A method according to claim 1 wherein the plants are cotton.

3. A method according to claim 1 wherein the plants are beans.

4. A method according to claim 1 wherein the plants are tomatoes.

5. A method of defoliating plants which comprises applying thereto in an amount sufficient to cause defoliation S,S,S-tri-n-butyl trithiophosphate.

6. A method according to claim 5 wherein the plants are cotton.

7. A method according to claim 1 wherein the trithiophosphate is dispersed in water.

8. A method of defoliating cotton which comprises applying thereto an S,S,S-tri-n-alkyl trithiophosphate wherein each alkyl group contains 3 to 5 carbon atoms, inclusive, dispersed in water containing a surface active agent at the rate of between about 0.5 and 10 pounds of trithiophosphate per acre of cotton.

9. A method according to claim 8 wherein the tri-n-alkyl trithiophosphate is tri-n-butyl trithiophosphate.

References Cited in the file of this patent

UNITED STATES PATENTS

| | | |
|---|---|---|
| 2,063,629 | Salzberg et al. | Dec. 8, 1936 |
| 2,242,260 | Prutton | May 20, 1941 |
| 2,269,396 | Jayne | Jan. 6, 1942 |
| 2,562,011 | Baumgartner | July 24, 1951 |
| 2,668,758 | Roos et al. | Feb. 9, 1954 |
| 2,841,486 | Osborn et al. | July 1, 1958 |